United States Patent [19]

Nakata et al.

[11] Patent Number: 5,543,470
[45] Date of Patent: Aug. 6, 1996

[54] VULCANIZED RUBBER FOR HEAT RESISTANT VIBRATION-ISOLATOR

[75] Inventors: Hiroki Nakata, Osaka; Mitsuhiko Sato, Chiba; Masashi Aoshima, Osaka, all of Japan

[73] Assignee: Sumitomo Chemical Company, Limited, Osaka, Japan

[21] Appl. No.: 351,595

[22] Filed: Dec. 7, 1994

[30] Foreign Application Priority Data

Dec. 8, 1993 [JP] Japan .................................. 5-308031
Sep. 20, 1994 [JP] Japan .................................. 6-224796

[51] Int. Cl.$^6$ ................................................ C08F 210/16
[52] U.S. Cl. ...................... 525/331.7; 525/313; 524/495; 524/496; 524/515; 524/525; 524/526
[58] Field of Search .................................. 524/495, 496, 524/515, 525, 526; 525/313, 331.7

[56] References Cited

U.S. PATENT DOCUMENTS

| | | | |
|---|---|---|---|
| 4,708,992 | 11/1987 | Tanimoto et al. | 525/313 |
| 4,803,020 | 2/1989 | Valaitis et al. | 264/22 |
| 5,214,103 | 5/1993 | Imao et al. | 525/193 |
| 5,247,009 | 9/1993 | Kitahara | 524/552 |

FOREIGN PATENT DOCUMENTS

| | | |
|---|---|---|
| B1188097 | 7/1986 | European Pat. Off. . |
| A14113930 | 10/1991 | Germany . |
| A53136053 | 11/1978 | Japan . |
| B5914064 | 4/1984 | Japan . |
| A3200854 | 9/1991 | Japan . |
| B373584 | 11/1991 | Japan . |
| A5086236 | 4/1993 | Japan . |

*Primary Examiner*—Edward J. Cain
*Attorney, Agent, or Firm*—Cushman Darby & Cushman, L.L.P.

[57] ABSTRACT

The present invention provides a vulcanized rubber for a heat resistant vibration-isolator which can be obtained by vulcanizing a composition comprising:

(A) 110–175 parts by weight of an oil-extended copolymer comprising 100 parts by weight of an ethylene-α-olefin-non-conjugated diene copolymer rubber with intrinsic viscosity [η] of 3 dl/g or more and 10–75 parts by weight of an extender oil;

(B) 5–20 parts by weight of a liquid diene polymer with melt viscosity of 100–3000 poise at 25° C., per 100 parts by weight of an ethylene-α-olefin-non-conjugated diene copolymer rubber; and (C) 10–80 parts by weight of a reinforcing filler, per 100 parts by weight of an ethylene-α-olefin-non-conjugated diene copolymer rubber; with an organic peroxide.

The vulcanized rubbers of the present invention have excellent thermal stability and durability, a low dynamic spring constant, and excellent processability. They are useful for a heat resistant vibration-isolator rubber, and are most suitable for applications such as vibration-isolators such as for automobiles, engine mounts, strato mounts, suspension bushings, exhaust mounts and the like, and uses of vibration-isolators for vehicles for railways, vehicles for construction, industrial instruments, and instruments for office-automation and the like.

18 Claims, No Drawings

VULCANIZED RUBBER FOR HEAT RESISTANT VIBRATION-ISOLATOR

BACKGROUND OF THE INVENTION

The present invention relates to a vulcanized rubber for a heat resistant vibration-isolator which has an excellent durability and processability, and a low dynamic spring constant.

Superior characteristics in durability, thermal stability, dynamic spring constant and the like are required for a vibration-isolator rubber to be widely used in the automobile field and the like. The dynamic spring constant is the extent of the change of elastic modulus (dynamic shear modulus of elasticity) at a high-frequency vibration and is represented by the ratio of dynamic shear modulus of elasticity and static shear modulus of elasticity. A dynamic spring constant is usually larger than 1, the lower the dynamic spring constant is, the superior the vibration-isolator property.

Hitherto, it has been well known that ethylene-α-olefin-non-conjugated diene copolymer rubber is used as rubber material for the vibration-isolator rubbers, but that this copolymer is inferior in durability although it is superior in thermal stability.

On the other hand, vulcanized rubber with a high molecular weight polymer (its intrinsic viscosity [η] measured at 70° C. in xylene is usually 2.5 dl/g or more) shows an improved durability, but does not have a satisfactory dynamic spring constant. Such rubber still has a problem that in the processing before vulcanization, it is apt to exhibit so-called "bagging" wherein a rubber composition rises to the surface of a roller during roll processing.

When a softener or carbon black is added in large amounts to the high molecular weight polymer in order to improve the processability, the dynamic spring constant of the resulting rubber increases and hence its vibration-isolator property becomes inferior.

The vulcanized rubber obtained from a rubber composition which comprises ethylene-α-olefin-non-conjugated diene copolymer rubber and hydrogenated liquid diene polymer (Japanese Examined Patent Publication (Koukoku) NO.3-73584) is excellent in processability, but suffers from a poor dynamic spring constant.

With a view to improve both the processability and vibration-isolator property of a vulcanized rubber, there has been proposed in Japanese Unexamined Patent Publication (Koukai) NO.53-22551 that a low molecular weight EPDM is blended with a high molecular weight EPDM. But, in this method, the dynamic spring constant of the resulting rubber is not satisfactory though the processability and durability can surely be improved. In this method, vulcanized rubbers with an excellent durability and processability, and a low dynamic spring constant can hardly be obtained.

Under the circumstances, the present inventors made an intensive study in order to obtain a vulcanized rubber for heat resistant vibration-isolator with a superior durability and a low dynamic spring constant, and, as a result, found that a vulcanized rubber with such superior properties such as excellent thermal stability, superior durability, excellent processability and low dynamic spring constant can be obtained when a rubber composition comprising a copolymer rubber having a particular intrinsic viscosity and a liquid diene polymer having a particular melt viscosity is vulcanized with an organic peroxide.

SUMMARY OF THE INVENTION

The present invention thus provides a vulcanized rubber for a heat resistant vibration-isolator which can be obtained by vulcanizing a composition comprising:
(A) 110–175 parts by weight of an oil-extended copolymer comprising 100 parts by weight of an ethylene-α-olefin-non-cojugated diene copolymer rubber with intrinsic viscosity [η] of 3 dl/g or more and 10–75 parts by weight of an extender oil;
(B) 5–20 parts by weight of a liquid diene polymer with melt viscosity of 100–3000 poise at 25° C., per 100 parts by weight of an ethylene-α-olefin-non-cojugated diene copolymer rubber; and
(C) 10–80 parts by weight of a reinforcing filler, per 100 parts by weight of an ethylene-α-olefin-non-cojugated diene copolymer rubber; with an organic peroxide.

DESCRIPTION OF THE PREFERRED EMBODIMENTS

In the vulcanized rubber for heat resistant vibration-isolator of the present invention, ethylene-α-olefin-non-conjugated diene copolymer rubber is used as a basic rubber material, and the preferred mole ratio of ethylene/α-olefin of the copolymer rubber is usually 60/20–80/20 in order to obtain appropriate dynamic spring constant dependancy on temperature.

The amount of the non-conjugated diene component in the copolymer rubber is preferably 0.5~3 mole % of the total monomers comprising the copolymer rubber in order to obtain appropriate thermal stability and vibration-isolator property in the vulcanized rubber.

In order that the said vulcanized rubber have an excellent durability, the intrinsic viscosity [η] of the said copolymer rubber must be 3 dl/g or more, preferably 3–5 dl/g, and more preferably 3.2–5 dl/g. The intrinsic viscosity [η] value when mentioned in the present specification means the value measured in xylene solution at 70° C. unless otherwise indicated.

For the ethylene-α-olefin-non-conjugated diene copolymer rubbers, propylene, 1-butene, 1-hexene and the like are used as the α-olefins, and as the non-conjugated dienes, 1,4-pentadiene, 1,4-hexadiene, divinyl benzene, dicyclopentadiene, methylene norbornene, ethylidene norbornene (hereinafter, abbreviated as ENB), vinyl norbornene and the like are used. The ethylene-α-olefin-non-conjugated diene copolymer rubbers derived from these monomers may be used alone or in combinations thereof.

In the present invention, the oil-extended ethylene-α-olefin-non-conjugated diene copolymer rubber is used to improve the processability of the non-vulcanized rubber composition.

As the extender oil, parafin processing oil and the like are used. They are used in such amount that their addition makes the Mooney viscosity ML 1+4 121° C. of the resulting oil-extended ethylene-α-olefin-non-conjugated diene copolymer rubber to be about 60–120. Specifically, the usual amount of the extender oil is 10–75 parts by weight per 100 parts by weight of the ethylene-α-olefin-non-conjugated diene copolymer rubber, preferably 30–75 parts by weight.

The extender oil is added to the ethylene-α-olefin-non-conjugated diene copolymer rubber to give the oil-extended copolymer rubber. The process oil may further be added to the rubber composition before the vulcanization.

In the present invention, an oil-extended ethylene-α-olefin-non-conjugated diene copolymer rubber which contains a reinforcing filler is used to improve the static property and dynamic spring constant of the vulcanized rubber.

As the reinforcing fillers, for example, carbon black, silica and the like are used, especially carbon black is preferred. The amount of the reinforcing filler is usually 10–80 parts by weight, and preferably—in cosideration of a dynamic spring constant—30–70 parts by weight per 100 parts by weight of the ethylene-α-olefin-non-conjugated diene copolymer rubber.

In the present invention, a liquid diene polymer is blended with the above-mentioned oil-extended ethylene-α-olefin-non-conjugated diene copolymer rubber for improving the vibration-isolator property by lowering the dynamic spring constant.

The liquid diene polymer used in the present invention is a homopolymer of 1,3-butadiene derivatives such as 1,3-butadiene, isoprene, 2,3-dimethyl-1,3-butadiene, butadiene glycol, butadiene di-carboxylic acid and the like, or a copolymer of these 1,3-butadiene derivatives with other polymerizable monomers such as styrene and the like, or their modified polymers.

For example, polybutadiene, polyisoprene, poly 2,3-dimethyl-1,3-butadiene, polybutadieneglycol, polybutadiene dicarboxylic acid, and the like can be used in the present invention. A liquid diene polymer having a high iodine value is preferable, especially those having an iodine value from 300 to 600.

The liquid diene polymer used in the present invention has a melt viscosity of 100–3,000 poises at 25° C., preferably 200–2,500 poises, more preferably 200–2,000 poises and most preferably 200–1,500 poises.

Among these liquid diene polymers, a liquid polybutadiene or a liquid polyisoprene is preferably used, especially a liquid polybutadiene with melt viscosity of 200–1,000 poises at 25° C. or a liquid polyisoprene with melt viscosity of 200–1,500 poises at 25° C. is preferred.

It is usually preferable to use 5–20 parts by weight of the liquid diene polymers per 100 parts by weight of the ethylene-α-olefin-non-conjugated diene copolymer rubber in order to improve the dynamic spring constant and tensile strength of the rubbers.

The vulcanized rubber for a heat resistant vibration-isolator of the present invention is obtained by vulcanizing a rubber composition comprising the oil-extended ethylne-α-olefin-non-conjugated diene copolymer rubbers which contains a reiforcing filler and the above-mentioned specified amount of the liquid diene polymer as an essential component. It is very important that the vulcanization of the composition of the present invention is carried out with an organic peroxide, and vulcanized rubbers obtained by other vulcanization methods such as sulfur curing are inferior in thermal stability and other properties.

As the organic peroxides, for example, dicumyl peroxide, di-tertiary butyl peroxide, tert-butyl cumylperoxide, 1,1-di(tert-butyl peroxy)- 3,3,5-trimethylcyclohexane, benzoylperoxde, lauroylperoxide and the like are used in the present invention.

The amount of the organic peroxide is 0.5–10 parts by weight, preferably 2–5 parts by weight, per 100 parts by weight of the ehtylene-α-olefin-non-conjugated diene copolymer rubber.

The vulcanized rubbers for a heat resistant vibration-isolator of the present invention may contain additives which are usually used in this field such as zinc oxide, stearic acid, a softnet, an antioxidant, an oxidation inhibitor, a process oil, a processing activating agent, a crosslinking coagent and the like.

As the crosslinking coagent used in the invention, sulfur, p-quinonedioxime, p,p-dibenzoylquinonedioxime, ethyleneglycol dimethacrylate, triallylisocyanurate and the like are mentioned. The amount of crosslinking coagent is usually 0.5–2 parts by weight, but the amount of sulfur must be 0.5 part or less, per 100 parts by weight of the ethylene-α-olefin-non-conjugated diene copolymer rubber.

The vulcanized rubbers of the present invention may contain a small amount of rubber components other than the ethylene-α-olefin-non-conjugated diene copolymer rubber, such as natural rubber, styrenebutadiene rubber and the like to adjust the adhesive property.

The vulcanized rubbers for heat resistant vibration-isolator of the present invention can be produced by (1) kneading the oil-extended ethylene-α-olefin-non-conjugated diene copolymer rubber with the reinforcing filler, the liquid diene polymer, organic peroxide and, if necessary, various additives, with an instrument conventionally used for the production of rubber products such as a Banbury mixer or open roll under the conventional conditions, then, (2) vulcanizing at a temperature, for example, not lower than about 120° C., preferably between about 150° C. and about 220° C. for 1–30 min. With an instrument conventionally used in the organic peroxide vulcanization of rubbers such as an injection machine or press.

The vulcanized rubbers for a heat resistant vibration-isolator of the present invention have a superior thermal stability and an excellent durability, a low dynamic spring constant, and an excellent processability.

In the following examples, the compression sets—the indication of the thermal stability—of samples were measured by heat-treating a sample at 120° C. for 70 hours in a Geer oven according to JIS K6301.

The compression sets of vulcanized rubbers of the present invention were found to be as good as 20% or less.

The durability of samples were measured by heat-treating test pieces at 120° C. for 70 hours by a fatigue tester (Fatigue to Failure Tester of Monsanto Company Ltd.) repeatedly at 140% elongation ratio at room temperature and counting elongation cycle numbers until breakage. The durability of vulcanized rubbers of the present invention is excellent, elongation cycle numbers are 200,000 or more.

The dynamic spring constant was indicated as Ed/Es, wherein static shear modulus of elasticity Es (Es=Gs×3) was calculated from static shear modulus Gs which was obtained according to JIS K6386, and dynamic shear modulus of elasticity Ed which was measured at 23° C. by a vibration frequency of 100 Hz and vibration width ±0.1% by Rheovibron (manufactured by Orientec Company Ltd.).

A lower dynamic spring constant is preferable for the vibration-isolator property. The dynamic spring constant of vulcanized rubbers of the present invention is excellent, the value is less than 1.9.

Thus vulcanized rubbers of the present invention have a superior thermal stability and an excellent durability, a low dynamic spring constant, and an excellent processability. They are useful for the vulcanized rubber for heat resistant vibration-isolator, and is most suitable for, for example, uses of vibration-isolators for automobile, such as for engine mounts, strato mounts, suspension bushings, exhaust mounts and the like, and uses of vibration-isolators for vehicles for railways, vehicles for construction, industrial instruments, and instruments for office-automation and the like.

EXAMPLES

The present invention is illustrated in detail by the following examples, but the invention is not restricted by the examples.

Melt viscosity was measured under the following conditions.

Instrument: RSM-800 RDS II manufactured by Rheometrix Company Ltd.
Measuring tool: Pararell plate with diameter of 25 mm.
Measuring temperature: 25° C.
Strain: 0.5%
Frequency: $2\pi$ radian/sec.

EXAMPLE 1

In a 1.7 l BR type Banbury mixer, 140 parts by weight of oil-extended copolymer rubber (1) [40 parts by weight of parafin processing oil per 100 parts by weight of ethylene-propylene-ENB copolymer rubber which has intrinsic viscosity $[\eta]$ of 3.3 dl/g measured at 70° C. in xylene, ethylene/propylene ratio of 70/30 and ENB ratio of 1.2 mole % was blended and Mooney viscosity ML 1+4 121° C. was adjusted as 96), 10 parts by weight of NISSEKI Polybutadiene B3000 (manufactured by Nippon Petrochemical Company Ltd.: liquid polybutadiene with melt viscosity of 500 poises at 25° C.), 70 parts by weight of FEF carbon black, 20 parts by weight of parafin processing oil, 5 parts by weight of zinc oxide and 1 part by weight of stearic acid were added and kneaded, and the rubber composition was obtained.

The rubber composition was transferred to a 10 inch open roll whose roll temperature was 60° C. and kneaded. The procesability (whether bagging occurred or not) and the skin condition of sheet were observed. The results are shown in Table 1.

After the roll temperature was dropped to 40° C., 5 parts by weight of organic peroxide (Sunperox DCP-98 manufactured by Sanken-kakou Company Ltd.) as a vulcanizer and 0.3 parts by weight of sulfur as a vulcanization activating agent per 100 parts by weight of the ethylene-propylene-ENB copolymer rubber were added and kneaded. The vulcanizing rubber composition obtained was heated at 170° C. for 20 minutes by heating-press and vulcanized sheets with 2 mm thickness were made.

Dynamic spring constant, heat stability (Compression set), and durability of the vulcanized rubber sheet obtained were measured. The result was shown in table 1.

Regarding estimation of the processability (bagging occurred or not), no bagging is represented as ⌈○⌋, and bagging is represented as ⌈x⌋, in the case of 2.5 mm roll gap. Regarding the skin condition of sheet, skin with flatness and no holes is represented as ⌈○⌋, and that with roughness and holes is represented as ⌈x⌋.

EXAMPLE 2 AND COMPARATIVE EXAMPLES 1 TO 6

Rubber compositions were prepared and vulcanized under the various blending conditons illustrated in table 1 according to the method of example 1 and vulcanized sheets were made of each composition.

The characteristics of each rubber compositions and the properties of each of the vulcanized rubber sheets is shown in table 1.

EXAMPLE 3

In 1.7 l BR type Banbury mixer, 120 parts by weight of the same oil-extended copolymer rubber (1) used in example 1, 10 parts by weight of Nisseki Polybutadiene B3000, 50 parts by weight of MAF carbon black, 5 parts by weight of zinc oxide, and 1 part by weight of stearic acid were added and kneaded, and a rubber composition was obtained. Vulcanized rubber sheets with thickness of 2 mm were made from the obtained rubber composition as in example 1.

The properties of the each tuber compositions and the characteristics of each of the rubber sheets were shown in table 2.

EXAMPLE 4, COMPARATIVE EXAMPLE 7

A rubber composition was prepared under various blending conditions indicated in table 2 according to the method of example 3, and vulcanized, and vulcanized rubber sheets were made of each composition.

The properties of each rubber composition and the characteristics of the vulcanized rubber sheets are shown in table 2.

EXAMPLE 5

A rubber composition was prepared as in example 3, except using the oil-extended copolymer rubber (2) [40 parts by weight of parafin processing oil per 100 parts by weight of ethylene-propylene-ENB copolymer rubber which has an intrinsic viscosity $[\eta]$ of 3.1 dl/g measured at 70° C. in xylene, an ethylene/propylene ratio of 65/35 and an ENB ratio of 1.3 mole % was blended and Mooney viscosity ML 1+4 121° C. was adjusted to 78), instead of the oil-extended copolymer rubber (1). The composition was vulcanized, and vulcanized rubber sheets were made.

The properties of the rubber composition and the characteristics of the vulcanized rubber sheets are shown in table 2.

EXAMPLE 6, COMPARATIVE EXAMPLE 8

A rubber composition was prepared under various blending conditions shown in table 2 according to the method of example 5 and vulcanized, and vulcanized rubber sheets were made.

The properties of each rubber composition and the characteristics of the vulcanized rubber sheets are shown in table 2.

COMPARATIVE EXAMPLES 9, 10

A rubber composition was prepared according to the method of example under the blending conditions shown in table 3, by using the oil-extended copolymer rubber (3) [40 parts by weight of parafin processing oil per 100 parts by weight of ethylene-propylene-ENB copolymer rubber, having an intrinsic viscosity $[\eta]$ of 2.7 dl/g measured at 70° C. in xylene, an ethylene/propylene ratio of 77/23 and an ENB ratio of 1.3 mole %, was blended and Mooney viscosity ML 1+4 121° C. was adjusted to 57). The composition was vulcanized, and vulcanized rubber sheets were made.

The properties of the rubber composition and the characteristics of the vulcanized rubber sheets are shown in table 3.

COMPARATIVE EXAMPLES 11, 12

A rubber composition was prepared under various blending conditions shown in table 3 according to the method of example 1 and vulcanized, and vulcanized rubber sheets were made.

The properties of each rubber composition and the characteristics of the vulcanized rubber sheets are shown in table 3.

EXAMPLE 7, COMPARATIVE EXAMPLES 13 to 15

A rubber composition was prepared under various blending conditions shown in table 4 according to the method of example 1 and vulcanized, and vulcanized rubber sheets were made.

The properties of each rubber composition and the characteristics of the vulcanized rubber sheets are shown in table 3.

EXAMPLES 8, 9, COMPARATIVE EXAMPLES 16 to 19

A rubber composition was prepared under various blending conditions shown in table 5 according to the method of example 1 and vulcanized, and vulcanized rubber sheets were made.

The properties of each rubber composition and the characteristics of the vulcanized rubber sheets are shown in table 4.

EXAMPLES 10, 11, COMPARATIVE EXAMPLES 20 to 25

A rubber composition was prepared under various blending conditions shown in table 6 according to the method of example 1 and vulcanized, and vulcanized rubber sheets were made.

The properties of each rubber composition and the characteristics of the vulcanized rubber sheets are shown in table 5.

EXAMPLES 12–15, COMPARATIVE EXAMPLE 26

A rubber composition was prepared under various blending conditions shown in table 6 according to the method of example 1, except using the oil-extended copolymer rubber (2) [40 parts by weight of parafin processing oil per 100 parts by weight of ethylene-propylene-ENB copolymer rubber which has intrinsic viscosity [η] of 3.2 dl/g measured at 70° C. in xylene, ethylene/propylene ratio of 79/21 and ENB ratio of 1.3 mole % was blended and Mooney viscosity ML 1+4 121° C. was adjusted as 93), instead of the oil-extended copolymer rubber (1). The composition was vulcanized and vulcanized rubber sheets were made.

The properties of the rubber composition and the characteristics of the vulcanized rubber sheets are shown in table 6.

EXAMPLES 16,17, COMPARATIVE EXAMPLE 27

A rubber composition was prepared under various blending conditions shown in table 6 according to the method of example 1, except using the oil-extended copolymer rubber (5) [50 parts by weight of parafin processing oil per 100 parts by weight of ethylene-propylene-ENB copolymer rubber which has an intrinsic viscosity [η] of 3.3 dl/g measured at 70° C. in xylene, an ethylene/propylene ratio of 70/30 and an ENB ratio of 1.2 mole % was blended and Mooney viscosity ML 1+4 121° C. was adjusted as 81), instead of the oil-extended copolymer rubber (1). The composition was vulcanized, and vulcanized rubber sheets were made.

The properties of the rubber composition and the characteristics of the vulcanized rubber sheets are shown in table 6.

An annotation: In the above-mentioned tables, the blending amount of each component of the rubber compositions and the blending prescription of the vulcanizers are indicated in parts by weight.

*1: The low-viscosity ethylene-propylene-ENB copolymer rubber having an intrinsic viscosity [η] of 0.33 dl/g measured at 30° C. in toluene, an ethylene/propylene mole ratio of 49/51, and an ENB ratio of 1.3 mole %.

*2: The mixture of 1 part by weight of antioxidant Sumilizer MB (manufactured by Sumitomo Chemical Company Ltd.) and 0.25 parts by weight of Antigene RD (manufactured by Sumitomo Chemical Company Ltd.).

*3: The liquid polyisoprene (TL-20 manufactured by Kuraray Company Ltd.) having melt viscosity of 700 poises at 25° C.

*4: The liquid polyisoprene (Kuraprene LIR-30 manufactured by Kuraray Company Ltd.) having melt viscosity of 1500 poies at 25° C.

*5: The liquid polyisoprene (Kuraprene LIR-506 manufactured by Kuraray Company Ltd.) having melt viscosity of 3600 poises at 25° C.

*6: The liquid polyisoprene (Kuraprene LIR-410 manufactured by Kuraray Company Ltd.) having melt viscosity of 5100 poises at 25° C.

*7: The liquid polyisoprene (Kuraprene LIR-290 manufactured by Kuraray Company Ltd.), whose 90% double bond hydrogenated, having melt viscosity of 38000 poise at 25° C.

TABLE 1

| | Example | | Comparative Example | | | | | |
|---|---|---|---|---|---|---|---|---|
| | 1 | 2 | 1 | 2 | 3 | 4 | 5 | 6 |
| Rubber composition | | | | | | | | |
| Oil-extended copolymer rubber (1) | 140 | 140 | 140 | 140 | 140 | 140 | 140 | 140 |
| Zinc oxide | 5 | 5 | 5 | 5 | 5 | 5 | 5 | 5 |
| Stearic acid | 1 | 1 | 1 | 1 | 1 | 1 | 1 | 1 |
| FEF-carbon black | 70 | 70 | 70 | 70 | 70 | 70 | 70 | 70 |
| Parafin processing oil | 20 | 20 | 20 | 20 | 20 | 20 | 20 | 20 |
| NISSEKI Polybutadiene B3000 | 10 | 15 | | | 10 | 15 | | |

TABLE 1-continued

|  | Example | | Comparative Example | | | | | |
|---|---|---|---|---|---|---|---|---|
|  | 1 | 2 | 1 | 2 | 3 | 4 | 5 | 6 |
| Low viscosity ethylene-propylene-ENB copolymer rubber[*1] |  |  |  |  |  |  | 10 | 15 |
| Blending prescription of vulcanizers |  |  |  |  |  |  |  |  |
| Sunperox DCP-98 | 5 | 5 | 5 |  |  |  | 5 | 5 |
| Sulfur | 0.3 | 0.3 | 0.3 | 1 | 1 | 1 | 0.3 | 0.3 |
| Soxinol BZ |  |  |  | 1.5 | 1.5 | 1.5 |  |  |
| Soxinol TT |  |  |  | 0.8 | 0.8 | 0.8 |  |  |
| Soxinol M |  |  |  | 0.5 | 0.5 | 0.5 |  |  |
| Property |  |  |  |  |  |  |  |  |
| Rubber composition |  |  |  |  |  |  |  |  |
| Processability | ○ | ○ | X | X | ○ | ○ | ○ | ○ |
| Skin condition of sheet | ○ | ○ | X | X | ○ | ○ | ○ | ○ |
| Valcanized rubber sheet |  |  |  |  |  |  |  |  |
| Dynamic spring constant | 1.8 | 1.8 | 2.1 | 2.3 | 3.2 | 3.4 | 2.2 | 2.2 |
| Compression set (%) | 11 | 10 | 14 | 48 | 67 | 73 | 14 | 14 |
| Durability (10000 cycles) | 23.2 | 30.8 | 15.4 | 5.4 | >50 | >50 | 22.9 | 38.8 |

TABLE 2

|  | Example | | | | Comperative Example | |
|---|---|---|---|---|---|---|
|  | 3 | 4 | 5 | 6 | 7 | 8 |
| Rubber composition |  |  |  |  |  |  |
| Oil-extended copolymer rubber (1) | 140 | 140 |  |  | 140 |  |
| Oil-extended copolymer rubber (2) |  |  | 140 | 140 |  | 140 |
| Zinc oxide | 5 | 5 | 5 | 5 | 5 | 5 |
| Stearic acid | 1 | 1 | 1 | 1 | 1 | 1 |
| MAF-carbon black | 50 | 50 | 50 | 50 | 50 | 50 |
| NISSEKI Polybutadiene B3000 | 10 | 15 | 10 | 15 |  |  |
| Blending prescription of vulcanizers |  |  |  |  |  |  |
| Sunperox DCP-98 | 3 | 3 | 3 | 3 | 3 | 3 |
| Sulfur | 0.2 | 0.2 | 0.2 | 0.2 | 0.2 | 0.2 |
| Property |  |  |  |  |  |  |
| Rubber composition |  |  |  |  |  |  |
| Processability | ○ | ○ | ○ | ○ | X | X |
| Skin condition of sheet | ○ | ○ | ○ | ○ | X | X |
| Valcanized rubber sheet |  |  |  |  |  |  |
| Dynamic spring constant | 1.7 | 1.6 | 1.8 | 1.8 | 1.9 | 2.0 |
| Compression set (%) | 12 | 11 | 13 | 12 | 14 | 15 |

TABLE 3

|  | Comparative Example | | | | Example | Comparative Example | | |
|---|---|---|---|---|---|---|---|---|
|  | 9 | 10 | 11 | 12 | 7 | 13 | 14 | 15 |
| Rubber composition |  |  |  |  |  |  |  |  |
| Oil-extended copolymer rubber (1) |  |  | 140 | 140 | 140 | 140 | 140 | 140 |
| Oil-extended copolymer rubber (3) | 140 | 140 |  |  |  |  |  |  |
| Zinc oxide | 5 | 5 | 5 | 5 | 5 | 5 | 5 | 5 |
| Stearic acid | 1 | 1 | 1 | 1 | 1 | 1 | 1 | 1 |
| MAF-carbon black | 70 | 70 | 70 | 70 | 70 | 70 | 70 | 70 |
| Parafin processing oil | 20 | 20 | 20 | 20 | 20 | 20 | 20 | 20 |
| NISSEKI Polybutadiene B3000 |  | 10 | 3 | 25 | 10 |  |  | 10 |

TABLE 3-continued

|  | Comparative Example | | | | Example | Comparative Example | | |
|---|---|---|---|---|---|---|---|---|
|  | 9 | 10 | 11 | 12 | 7 | 13 | 14 | 15 |
| Blending prescription of vulcanizers | | | | | | | | |
| Sunperox DCP-98 | 5 | 5 | 5 | 5 | 3 | 3 | | |
| Sulfur | 0.3 | 0.3 | 0.3 | 0.3 | 0.2 | 0.2 | 3 | 3 |
| Soxinol BZ | | | | | | | 1.5 | 1.5 |
| Soxinol TT | | | | | | | 0.8 | 0.8 |
| Soxinol M | | | | | | | 0.5 | 0.5 |
| Property | | | | | | | | |
| Rubber composition | | | | | | | | |
| Processability | ○ | ○ | X | ○ | ○ | X | X | ○ |
| Skin condition of sheet | ○ | ○ | X | ○ | ○ | X | X | ○ |
| Valcanized rubber sheet | | | | | | | | |
| Dynamic spring constant | 2.2 | 2.1 | 2.0 | 2.1 | 1.8 | 2.0 | 1.5 | 2.0 |
| Compression set (%) | 15 | 11 | 12 | 10 | 14 | 18 | 65 | 48 |
| Durability (10000 cycles) | 9.5 | 29.9 | 11.1 | 12.6 | 26.3 | 9.2 | 0.1 | 45.8 |

TABLE 4

|  | Example | | Comparative Example | | | |
|---|---|---|---|---|---|---|
|  | 8 | 9 | 16 | 17 | 18 | 19 |
| Rubber composition | | | | | | |
| Oil-extended copolymer rubber (1) | 140 | 140 | 140 | 140 | 140 | 140 |
| Zinc oxide | 5 | 5 | 5 | 5 | 5 | 5 |
| Stearic acid | 1 | 1 | 1 | 1 | 1 | 1 |
| FEF-carbon black | 60 | 60 | 60 | 60 | 60 | 60 |
| Parafin processing oil | 10 | 10 | 10 | 10 | 10 | 10 |
| Antioxidant *2 | 1.25 | 1.25 | 1.25 | 1.25 | 1.25 | 1.25 |
| Liquid polyisoprene 1 *3 | 10 | | | | | |
| Liquid polyisoprene 2 *4 | | 10 | | | | |
| Liquid polyisoprene 3 *5 | | | 10 | | | |
| Liquid polyisoprene 4 *6 | | | | 10 | | |
| Liquid polyisoprene 5 *7 | | | | | | 10 |
| Blending prescription of vulcanizers | | | | | | |
| Sunperox DCP-98 | 3 | 3 | 3 | 3 | 3 | 3 |
| Sulfur | 0.2 | 0.2 | 0.2 | 0.2 | 0.2 | 0.2 |
| Property | | | | | | |
| Rubber composition | | | | | | |
| Processability | ○ | ○ | X | X | X | ○ |
| Skin condition of sheet | ○ | ○ | X | X | X | |
| Valcanized rubber sheet | | | | | | |
| Dynamic spring constant | 1.7 | 1.7 | 1.9 | 2.0 | 2.0 | 2.0 |
| Compression set (5) | 20 | 20 | 21 | 24 | 25 | 24 |
| Durability (10000 cycles) | >50 | >50 | 14.3 | — | — | — |

TABLE 5

|  | Example | | Comparative Example | | | | | |
|---|---|---|---|---|---|---|---|---|
|  | 10 | 11 | 20 | 21 | 22 | 23 | 24 | 25 |
| Rubber composition | | | | | | | | |
| Oil-extended copolymer rubber (1) | 140 | 140 | 140 | 140 | 140 | 140 | 140 | 140 |

TABLE 5-continued

|  | Example | | Comparative Example | | | | | |
|---|---|---|---|---|---|---|---|---|
|  | 10 | 11 | 20 | 21 | 22 | 23 | 24 | 25 |
| Zinc oxide | 5 | 5 | 5 | 5 | 5 | 5 | 5 | 5 |
| Stearic acid | 1 | 1 | 1 | 1 | 1 | 1 | 1 | 1 |
| FEF-carbon black | 60 | 60 | 60 | 60 | 60 | 60 | 60 | 60 |
| Parafin processing oil | 10 | 10 | 10 | 10 | 10 | 10 | 10 | 10 |
| Liquid Polyisoprene 2 *4 | 8 | 12 |  | 24 |  | 8 | 12 | 24 |
| Blending prescription of vulcanizers |  |  |  |  |  |  |  |  |
| Sunperox DCP-98 | 3 | 3 | 3 | 3 |  |  |  |  |
| Sulfur | 0.2 | 0.2 | 0.2 | 0.2 | 1 | 1 | 1 | 1 |
| Soxinol BZ |  |  |  |  | 1.5 | 1.5 | 1.5 | 1.5 |
| Soxinol TT |  |  |  |  | 0.8 | 0.8 | 0.8 | 0.8 |
| Soxinol M |  |  |  |  | 0.5 | 0.5 | 0.5 | 0.5 |
| Property |  |  |  |  |  |  |  |  |
| Rubber composition |  |  |  |  |  |  |  |  |
| Processability | ○ | ○ | X | ○ | X | ○ | ○ | ○ |
| Skin condition of sheet | ○ | ○ | X | ○ | X | ○ | ○ | ○ |
| Valcanized rubber sheet |  |  |  |  |  |  |  |  |
| Dynamic spring constant | 1.7 | 1.7 | 1.9 | 1.9 | 1.7 | 2.3 | 2.4 | 2.8 |
| Compression set (%) | 18 | 20 | 17 | 21 | 52 | 59 | 71 | 81 |

TABLE 6

|  | Example | | | | Comparative Example | | Example | |
|---|---|---|---|---|---|---|---|---|
|  | 12 | 13 | 14 | 15 | 26 | 27 | 16 | 17 |
| Rubber composition |  |  |  |  |  |  |  |  |
| Oil-extended copolymer rubber(4) | 140 | 140 | 140 | 140 | 140 |  |  |  |
| Oil-extended copolymer rubber(5) |  |  |  |  |  | 150 | 150 | 150 |
| Zinc oxide | 5 | 5 | 5 | 5 | 5 | 5 | 5 | 5 |
| Stearic acid | 1 | 1 | 1 | 1 | 1 | 1 | 1 | 1 |
| FEF-carbon black | 40 | 40 | 40 | 40 | 40 | 60 | 60 | 60 |
| Parafin processing oil |  |  |  |  |  | 10 | 10 | 10 |
| Antioxidant | 1.25 | 1.25 | 1.25 | 1.25 | 1.25 | 1.25 | 1.25 | 1.25 |
| NISSEKI Polybutadiene B3000 | 5 | 10 | 15 | 20 |  |  | 10 | 15 |
| Blending prescription of vulcanizers |  |  |  |  |  |  |  |  |
| Sunperox DCP-98 | 3.5 | 3.5 | 3.5 | 3.5 | 3.5 | 5 | 5 | 5 |
| Sulfur | 0.2 | 0.2 | 0.2 | 0.2 | 0.2 | 0.3 | 0.3 | 0.3 |
| Property |  |  |  |  |  |  |  |  |
| Rubber composition |  |  |  |  |  |  |  |  |
| Processability | ○ | ○ | ○ | ○ | X | X | ○ | ○ |
| Skin condition of sheet | ○ | ○ | ○ | ○ | X | X | ○ | ○ |
| Vulcanized rubber sheet |  |  |  |  |  |  |  |  |
| Dynamic spring constant | 1.6 | 1.6 | 1.5 | 1.6 | 1.8 | 1.8 | 1.6 | 1.6 |
| Compression set (%) | 13 | 12 | 12 | 12 | 16 | 17 | 15 | 14 |

What is claimed is:

1. A vulcanized rubber obtained by vulcanizing with an organic peroxide a composition comprising:
(A) 110–175 parts by weight of an oil-extended copolymer comprising 100 parts by weight of an ethylene-α-olefin-non-cojugated diene copolymer rubber with intrinsic viscosity [η] of 3 dl/g or more and 10–75 parts by weight of an extender oil;
(B) 5–20 parts by weight of a liquid diene polymer with melt viscosity of 100–3000 poise at 25° C., per 100 parts by weight of an ethylene-α-olefin-non-cojugated diene copolymer rubber; and
(C) 10–80 parts by weight of a reinforcing filler, per 100 parts by weight of an ethylene-α-olefin-non-cojugated diene copolymer rubber.

2. The vulcanized rubber according to claim 1, wherein the melt viscosity of the liquid diene polymer is 200–1500 poise at 25° C.

3. The vulcanized rubber according to claim 1, wherein the iodine value of the liquid diene polymer is larger than 300 but smaller than 600.

4. The vulcanized rubber according to claim 1, the liquid diene polymer is a liquid polybutadiene or a liquid polyisoprene.

5. The vulcanized rubber according to claim 1, the organic peroxide is selected from the group of dicumyl peroxide, di-tertiary butyl peroxide, tert-butyl cumylperoxide, 1,1-di(tert-butyl peroxy)- 3,3,5-trimethylcyclohexane, benzoylperoxde and lauroylperoxide.

6. The vulcanized rubber according to claim 1, the amount of the organic peroxide is 0.5–10 parts by weight per 100 parts by weight of an ethylene-α-olefin-non-cojugated diene copolymer rubber.

7. The vulcanized rubber according to claim 1, the amount of a reinforcing filler is 30–70 parts by weight per 100 parts by weight of the ethylene-α-olefin-non-cojugated diene copolymer rubber.

8. The vulcanized rubber according to claim 1, the reinforcing filler is carbon black.

9. The vulcanized rubber according to claim 1, the amount of the extender oil is 30–75 parts by weight per 100 parts by weight of the ethylene-α-olefin-non-cojugated diene copolymer rubber.

10. A heat resistant vibration-isolator comprising the vulcanized rubber of claim 1.

11. A heat resistant vibration-isolator comprising the vulcanized rubber of claim 2.

12. A heat resistant vibration-isolator comprising the vulcanized rubber of claim 3.

13. A heat resistant vibration-isolator comprising the vulcanized rubber of claim 4.

14. A heat resistant vibration-isolator comprising the vulcanized rubber of claim 5.

15. A heat resistant vibration-isolator comprising the vulcanized rubber of claim 6.

16. A heat resistant vibration-isolator comprising the vulcanized rubber of claim 7.

17. A heat resistant vibration-isolator comprising the vulcanized rubber of claim 8.

18. A heat resistant vibration-isolator comprising the vulcanized rubber of claim 9.

* * * * *